US008281272B1

(12) United States Patent
Ginetti

(10) Patent No.: US 8,281,272 B1
(45) Date of Patent: Oct. 2, 2012

(54) SYSTEM AND METHOD TO GENERATE RE-USEABLE LAYOUT COMPONENTS FROM SCHEMATIC COMPONENTS IN AN IC DESIGN WITH HIERARCHICAL PARAMETERS

(75) Inventor: Arnold Ginetti, Antibes (FR)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 13/270,056

(22) Filed: Oct. 10, 2011

Related U.S. Application Data

(60) Provisional application No. 61/529,754, filed on Aug. 31, 2011.

(51) Int. Cl.
*G06F 9/455* (2006.01)
*G06F 17/50* (2006.01)
*G06F 15/04* (2006.01)

(52) U.S. Cl. ...................................... 716/119; 716/139
(58) Field of Classification Search .................. 716/119, 716/139
See application file for complete search history.

(56) References Cited

U.S. PATENT DOCUMENTS

| 6,922,659 | B2* | 7/2005 | Karniewicz ........................ 703/1 |
| 7,555,739 | B1 | 6/2009 | Ginetti et al. |
| 7,949,987 | B1* | 5/2011 | Ginetti et al. ................. 716/139 |
| 7,971,175 | B2 | 6/2011 | Ginetti et al. |
| 8,046,730 | B1* | 10/2011 | Ferguson et al. ............. 716/139 |
| 2011/0061034 | A1* | 3/2011 | Ginetti et al. ................. 716/104 |
| 2011/0307854 | A1* | 12/2011 | Lu et al. ......................... 716/119 |

OTHER PUBLICATIONS

Bhushan, P., et al., "Schematic PCell Implementation in Virtuoso® Platform", Proceedings of the International Cadence Users Group Conference, Santa Clara, CA, (Sep. 13-15, 2004), 12 pgs.

* cited by examiner

*Primary Examiner* — Suresh Memula
(74) *Attorney, Agent, or Firm* — Schwegman Lundberg & Woessner, P.A.

(57) ABSTRACT

A method is provided to produce an integrated circuit layout design comprising: providing in non-transitory storage a pPar parent cell that includes one or more pPar instances and that specifies one or more corresponding input parameter values; producing a graphical representation on a computer display screen of a first schematic design that includes a pPar parent instance; instantiating in non-transitory storage a parameterized cell supermaster that corresponds to the pPar parent cell; determining whether a core layout cell is stored in non-transitory storage that corresponds to the parameterized cell supermaster and the one or more corresponding input parameter values; in response to determining that such a core layout cell is stored, filling a first parameterized cell submaster with an instance of the stored core layout cell; in response to determining that such a core layout cell is not stored, using program code associated with the parameterized cell supermaster to generate a core layout cell; and storing the generated core layout cell in non-transitory storage.

13 Claims, 11 Drawing Sheets

US 8,281,272 B1

SYSTEM AND METHOD TO GENERATE RE-USEABLE LAYOUT COMPONENTS FROM SCHEMATIC COMPONENTS IN AN IC DESIGN WITH HIERARCHICAL PARAMETERS

CLAIM OF PRIORITY

This application claims the benefit of priority under 35 U.S.C. §119(e) to U.S. Provisional Patent Application Ser. No. 61/529,754, filed on Aug. 31, 2011, the benefit of priority of which is claimed hereby, and which is incorporated by reference herein in its entirety.

BACKGROUND

During the process of designing an integrated circuit (IC), a circuit designer often uses software-based graphical circuit design tools to build schematic representations of circuit designs that include symbolic representations of logical components such as inverters and other logical gates and symbolic representations of more complex functional components such as adders or Phase Lock Loops (PLLs), for example. In a hierarchical design, the schematic representations of components at a more abstract higher level of a design hierarchy hide design details shown within corresponding schematic representations at less abstract lower levels of the design hierarchy. During the design of an IC, a schematic design may be converted to a layout design, which specifies the relative positions of the geometric structures used to implement the circuit elements such as transistors, resistors, capacitors and guard rings that correspond to components of the schematic design.

In a cell-based IC design, repetitive blocks of circuitry are represented by cells that may be accessed from a design cell library using the software tool. In a cell-based hierarchical IC design, cells disposed higher in an IC design hierarchy may contain instances of other cells lower in the hierarchy. A schematic design cell higher in the hierarchy provides a graphical visual representation of the circuit functionality and hides from the user much of the detail and complexity of design cells lower in the hierarchy. A layout design comprises layout cells. A layout cell contains instances of layout cells and/or physical geometries (e.g., a metal1 stripe). The 'Top Cell' in a design is not instantiated within any other cell of the design. A 'bottom cell' in a design does not contain any instance (of other cells).

FIG. 1A is an illustrative drawing showing a representative symbolic cell (INV/Symbol) 101. FIG. 1B is an illustrative drawing showing a representative design schematic (Design/Schematic) 102 containing one instance 104 of the symbolic cell INV/Symbol 101 of FIG. 1A. FIG. 1C is an illustrative drawing showing a representative schematic cell (INV/Schematic) 108 that corresponds to the instance 104 of FIG. 1B and that contains two instances of symbolic devices, a pmos transistor device and an nmos transistor device. It will be understood that an overall circuit design may include Design/Schematic 102 or its equivalent INV/Schematic 108. However, the higher level of abstraction Design/Schematic 102 often is used to hide details shown in the lower level of abstraction INV/Schematic 108 so as so as to make the overall design more readable to the circuit designer.

A parameterized cell, or 'pcell', is a graphic, programmable cell that allows creation of a customized instance of the pcell each time it is placed or used in design. When instantiating a parameterized cell, a designer specifies values for parameters associated with the parameterized cell. A layout pcell is used to generate geometric structures used in a layout design. A schematic pcell is a variant of a layout pcell, which can be used in schematic designs. The use of pcells obviates the need to store individual instances of each cell. Rather, pcells are evaluated and instantiated when a design is opened, for example. The parameters of a pcell typically are used to determine the geometric dimensions of a corresponding circuit element represented by the pcell. Thus, complex geometric structures that make up circuit elements in an electronic design typically can be generated automatically based upon parameters specified by a circuit designer using a design tool. For example, a circuit designer may assemble a design that comprises multiple cells and may associate parameters with the cells. The design tool uses the parameters to generate geometric structures, represented in software data structures that correspond to actual physical structures that will be used to implement circuit elements represented by corresponding design cells.

A pcell supermaster is a type of parameterized cell that is encoded in a computer readable device and that typically is associated with a list of parameters, parameter types, parameter default values and with logic in the form of computer program code. A designer specifies parameter values of its parameters for the pcell supermaster. An automated design tool uses the logic of the pcell supermaster to generate a cell referred to as a pcell submaster that complies with the user-specified parameter values. In a typical session of an automated design tool usage, all regular cell instances of the same pcell supermaster that share the same parameter values typically also will share the same pcell submaster. Thus, instances of a regular cell within a design may be copies of a pcell submaster.

FIG. 2 is an illustrative diagram representing an data structure 200 of a parameterized cell (pcell) that is encoded in a computer readable storage device in accordance with certain prior art. The example parameterized cell data structure 200 includes a supermaster object 202 that includes computer program logic to determine geometric structures, and also includes parameter definitions and default values. Submaster objects 204-1 to 204-N are associated with the supermaster and represent different instances of the design cell that contain different unique geometries produced using code from the supermaster 202 and different unique sets of parameter values. Cell instances 206-1 to 206-N of the design cell inherit geometries from corresponding submasters 204-1 to 204-N.

More specifically, the circuit element represented by the illustrative example parameterized design cell data structure 200 of FIG. 2 is an nmos transistor. The supermaster 202 defines parameters L (length) and W (width) and includes program logic (not shown) to determine dimensions of geometric structures associated with the nmos transistor based upon parameter values. Each of the submasters 204-1 to 204-N represents a different unique instance of the nmos transistor determined with the supermaster logic using a different unique parameter value. For example, assume that a pcell supermaster 202 defines two integer parameters, namely "width" and "length". As well, assume that pcell supermaster is associated with software logic specifying to create a rectangle corresponding to the user-specified values for a width parameter and a length parameter on some hard-coded layer within a circuit design, such as "metal1". A designer could instantiate that pcell supermaster within a design and specify on the created instance the width parameter value to be 5 and the length parameter value to be 2. At that point, the tool application can be used to automatically create a pcell submaster 204-1 that will contain a rectangle of width=5 and length=2 on layer metal1.

It will be appreciated that often the code associated with a pcell supermaster not only can be used to create geometries but also can be used to instantiate some lower level cell.

Moreover, there exist both schematic pcell supermasters and layout pcell supermasters. The code within a schematic pcell supermaster typically creates instances of a symbolic cells and/or abstract wires. A schematic pcell submaster thus typically contains abstract wires and/or instances of symbolic cells. The code within a layout pcell supermaster typically creates layout pcell submaster instances that include instances of layout cells and/or geometries. A layout pcell submaster thus typically contains geometries and/or instances of layout cells.

Parameter expressions have been used to define parameter values. For example, a parameter 'par1' may be defined as '1+2', e.g., par1=1+2. Hierarchical parameter values are parameter values that are passed between design cells at different hierarchy levels in an IC design hierarchy. For example, assuming that 'pPar( )' represents a computer program function that can be used to retrieve the value of a passed parameter, the following hierarchical parameter expression defines the value of parameter 'par2' as the value of a parent parameter 'par3' multiplied by 2: 'par2=pPar(par3)*2'.

FIGS. 1A-1C are illustrative drawings of a design that includes an example of a 'parent schematic cell' (FIG. 1B) containing one 'pPar parent instance' of a 'pPar parent symbolic cell' (FIG. 1A) corresponding to a 'pPar parent schematic cell' (FIG. 1C) displayed on a computer device screen display in accordance with certain prior art. As used herein, a 'pPar instance' is an instance that has at least one parameter value defined as a function of passed parameter. As used herein, a 'pPar parent cell' is a cell which instantiates at least one pPar instance. A "pPar parent instance" is an instance of a pPar parent cell.

More particularly, a pPar parent instance in a hierarchical design passes a parameter to a pPar instance within a pPar cell. The pPar instance is associated with an expression within the pPar cell. The expression associated with the pPar instance uses the parameter passed to the pPar instance within the pPar cell to produces geometry structures or dimensions associated with the pPar instance. As used herein, the term 'pPar' signifies 'parameter passing' and signifies involvement in hierarchical passing of a parameter value within a hierarchical design.

It will be appreciated that the parent schematic design 102 and the schematic design cell 108 comprise computer program logic including program code and data structures encoded in a computer readable device to produce the illustrative displays.

The parent schematic design cell 102 displays a pPar parent instance symbol 104 that represents functionality of an inverter while hiding details of circuit components used to implement the inverter functionality. The parent schematic design 102 also displays user specified parameters 106. The parent schematic design 102 with its associated parameters is re-useable and may be copied multiple times within an IC design. Thus, a user need only enter the parameter values one time.

The schematic pPar parent cell 108 displays details of circuit components of an inverter. Specifically, for example, the schematic pPar parent cell 108 includes an instance of pmos transistor M0 and an instance of nmos transistor M1. The schematic pPar parent cell 108 also includes pmos instance parameters 110 and nmos instance parameters 112, which define geometric dimensions of the respective pmos and nmos devices M0 and M1 in terms of expressions that include parameters passed from the parent schematic design cell 102. For example, the instance parameter 'nf' is defined by the expression 'pPar("MULP")' in which the function 'pPar("MULP")' indicates that the value 'MULP' is passed from the parent design cell 102. An advantage of using passed parameters is that a circuit designer can specify parameters associated with a schematic design cell at a higher an IC design hierarchy and cause the design tool to pass those parameters to multiple lower level design cell instances at a lower level in the IC design hierarchy. Thus, the designer need not go through the trouble of individually specifying parameters for each schematic design instance.

Referring to FIG. 3A, there is shown an illustrative drawing of a schematic design 302 that includes a first set 303 of pPar parent instances 304-1 to 304-3 and a second set 305 of pPar parent instances 306-1 to 306-3 that correspond to the schematic pPar parent cell 108 of FIG. 1A and 1C in accordance with certain prior art. The first set of pPar parent instances 304-1 to 304-3 has different parameters than the second set of pPar parent instances 306-1 to 306-3.

FIG. 3B is an illustrative drawing representing a design layout 308 encompassing instances of transistor layout pcell supermaster produced by using a schematic driven layout generation tool to apply parameters of the schematic design 302 of FIG. 3A to the expressions shown in the instance schematic design cell 108 of FIG. 1B in accordance with certain prior art. Note that the twelve rectangles represented on FIG. 3B do not represent geometries, but rather instances of pcell supermasters. The evaluation of those instances of pcell supermasters produces pcell submasters containing the transistor geometries. In this example, a first set of layout pcell supermaster instances 310-1 to 310-3 that implement the transistors M0 and M1 correspond to pPar parent instances 304-1 to 304-3, and a second set of layout pcell supermaster instances 312-1 to 312-3 that implement the transistors M0 and M1 correspond to pPar parent instances 306-1 to 306-3. Specifically, the rectangles labeled with the symbol 'p' represents pmos transistor layout pcell supermaster instances, and the rectangles labeled with the symbol 'n' represents nmos transistor layout pcell supermaster instances. In this example pcell supermaster instance evaluation generates corresponding geometric structures, e.g. the 'n' and 'p' structures, in the first set of geometric structures 310-1 to 310-3 that have the same dimensions, and generates corresponding geometric structures in the second set 312-1 to 312-3 that have the same dimensions. However, in accordance with the parameters, dimensions of structures in the first set are generally smaller than dimensions structures in the second set. Also in this example, the schematic driven layout generation tool generates instances of 'n' and 'p' layout device pcell supermasters that are not uniformly placed within either the first layout pcell supermaster instances 310-1 to 310-3 or the second layout pcell supermaster instances 312-1 to 312-3.

A possible consequence of the non-uniform layout of the geometric structures in the different layout supermaster instances is that the transistor implementations could have different electrical characteristics, which could impact behavior of the IC design. One prior solution to the non-uniform layout problem is for the circuit designer to manually adjust the placement and routing among geometric structures. Another approach is to invoke automatic placement and routing tools to automate the placement and routing of the geometric structures. However, the manual approach typically is too complex and tedious to be practical, and the automated placement and routing does not guarantee uniform placement and routing.

Another prior solution is proposed in commonly owned U.S. Pat. No. 7,555,739 entitled, Method and Apparatus for Maintaining Synchronization between Layout Clones, which issued Jun. 30, 2009. An instance design cell within a design is 'cloned' such that not only do all instances of the clone have the same geometric dimensions, but they also have the same layout. Referring to the illustrative drawings of FIG. 3C, there is shown a representation of a design layout 313 encompassing instances of nmos and pmos transistors layout pcell supermaster produced by using a schematic driven layout generation tool to apply parameters of the schematic design 202 of FIG. 3A to the expressions shown in the instance schematic design cell 108 of FIG. 1C and to synchronize layout clones in accordance with certain prior art. Dashed lines 314 about the first set of geometric structures of the first layout pcell supermaster instances 310-1 to 310-3 indicate that these structures are clones within a first equivalence group. Dashed lines 316 about the second set of geometric structures of the second layout pcell supermaster instances 312-1 to 312-3 indicate that these structures are clones within a second equivalence group. The '736 patent explains that a plurality of layout clones are associated with one another within equivalence groups. Each layout clone comprises at least one figure. Relationships are tracked between equivalent figures of the plurality of layout clones. Edits made by a user to one of the layout clones in an equivalence group are propagated to the other layout clones within that equivalence group. In this manner, cloned layout designs within an equivalence group are kept in synchronization with each other despite edits to the layouts of one or more clones in the group.

While earlier approaches to achieving uniform layout generally have been acceptable, there have been shortcomings with their use. For example, synchronization of layout clones was not readily transferrable across designs. In other words, a layout of clones within an equivalence group within one design was not readily re-useable within a different design. Thus, there has been a need for the re-use of design cell layouts across different designs.

DESCRIPTION OF THE EMBODIMENTS

The following description is presented to enable any person skilled in the art to create and use a computer system configuration and related method and article of manufacture to use a parameterized cell to produce instances associated with layouts that can be used across different designs. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and processes are shown in block diagram form in order not to obscure the description of the invention with unnecessary detail. Thus, the present invention is not intended to be limited to the embodiments shown, but is to be accorded the widest scope consistent with the principles and features disclosed herein. In the following description, similar or substantially identical items shown in different drawings are labeled with identical reference numbers.

Figure 4:
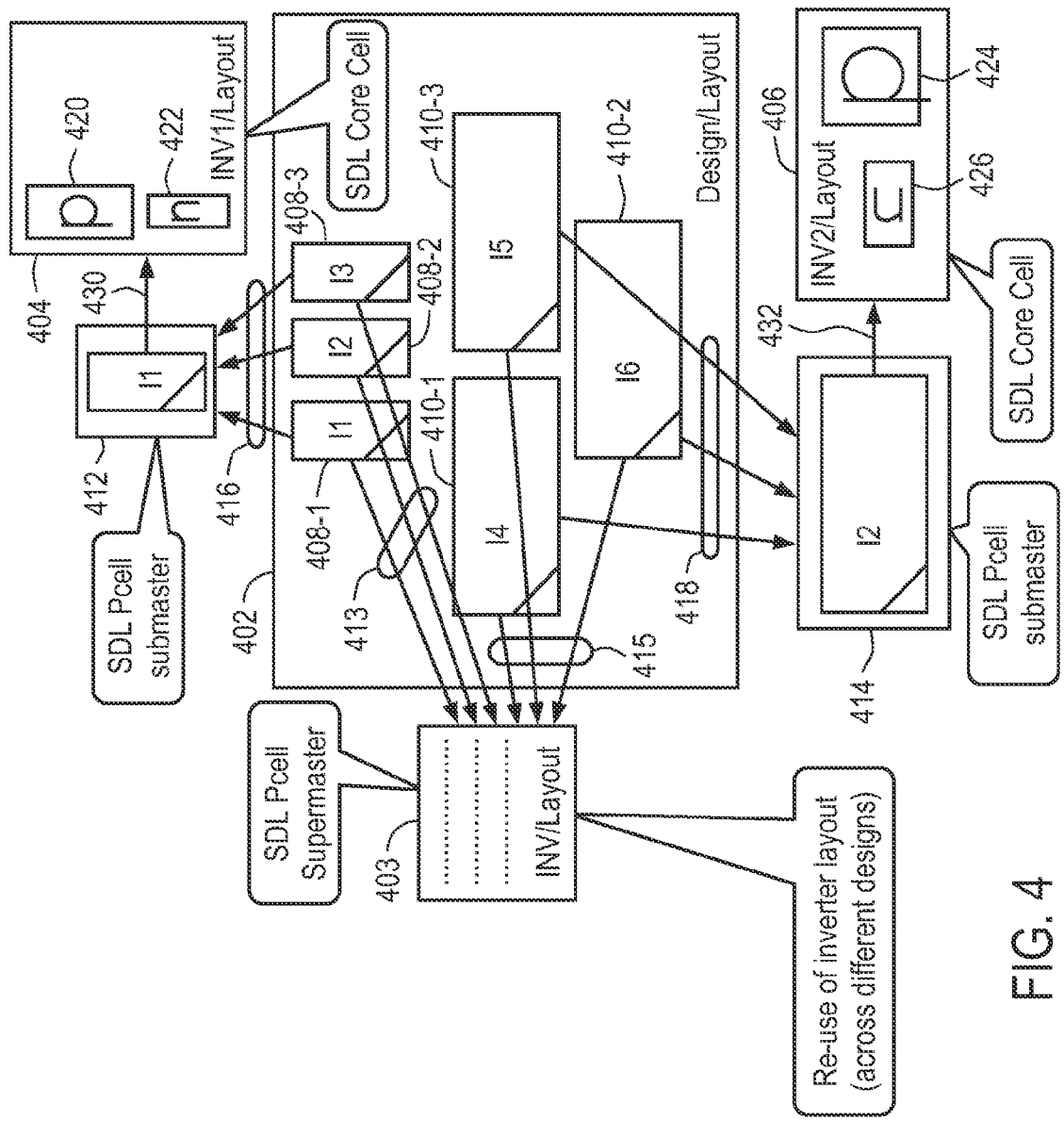
FIG. 4 is an illustrative drawing of a design layout that is generated using a schematic driven design (SDL) pcell supermaster and that includes a first core layout cell and a second core layout cell that are re-useable across different designs in accordance with some embodiments.

FIG. 4 is an illustrative drawing of a design layout 402 that is generated using a schematic driven layout (SDL) pcell supermaster 403 and that includes a first core layout cell 404 and a second core layout cell 406 that are re-useable across different designs in accordance with some embodiments. As used herein a 'core layout cell' includes a layout cell associated with a pedigree (e.g., as properties or hidden database extension) that is stored in a cell library in a computer readable device associated. As used herein, a 'pedigree' includes a name of the parameterized cell and values of the parameters used to generate that core layout cell. As an example, based the pedigree of the INV_1 core layout cell 404 will include {INV MULP=1 nl=100 nw=100 pl=100 pw=100}. This pedigree allows for the evaluation of the pcell supermaster instance 403. Code associated with the pcell supermaster 403 configures a computer system to automatically obtain a core layout cell corresponding to a set of parameters associated with one or more instances within a design and to create an instance of that core layout cell within a corresponding pcell submaster that corresponds to the one or more instances.

The example design layout 402 includes a first set of identical circuit element instances 408-1, 408-2 and 408-3 and a second set of identical circuit element instances 410-1, 410-2 and 410-3. A first submaster object 412 represents first unique geometric dimensions determined based upon program code logic associated with the SDL pcell supermaster 403 and unique parameters as indicated by arrows 413. More specifically, the first submaster object 412 is associated with contains one instance of the first core layout cell 404 as indicated by arrow 430. Thus, the first core layout cell 404 fills the first submaster object 412 in that it contains first and second instance element geometries and their layouts. The first set of circuit element instances 408-1, 408-2 and 408-3 share the same parameters and are of the same pcell supermaster 403 as indicated by arrows 413. They also share the same pcell submaster 412 as indicated by arrows 416, which instantiates one instance of the layout core cell 404. A second submaster object 414 represents second unique geometric dimensions determined based upon code associated with the supermaster 403 and unique parameters as indicated by arrows 415. More particularly, the second submaster object 414 is associated with an instance of the second core layout cell 406 as indicated by arrow 432. Thus, the second core layout cell 406 fills the second submaster object 414 in that it contains first and second instance element geometries and their layouts. The second set of circuit element instances 410-1, 410-2 and 410-3 share the same parameters and the same pcell supermaster 403 as indicated by arrows 415. They also share the same pcell submaster 414, which instantiates one instance of the layout core cell 406.

Figure 1A:
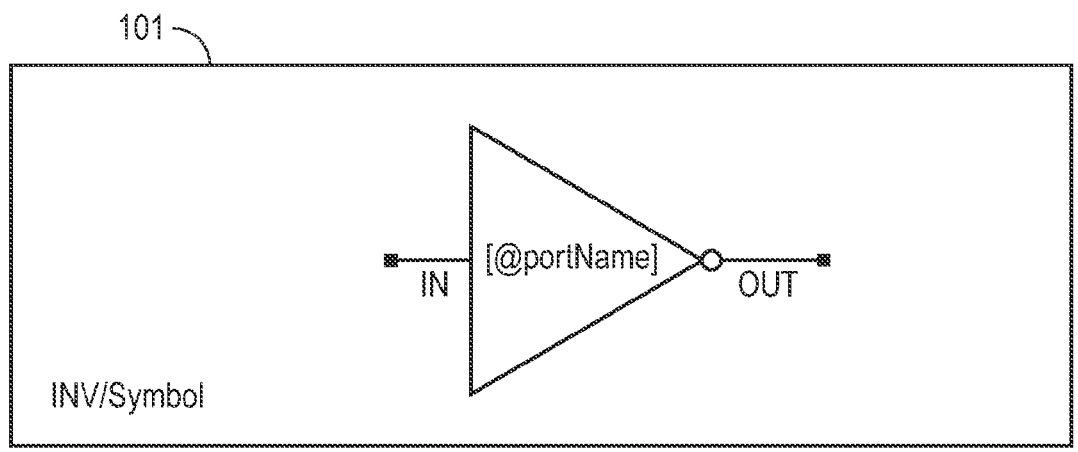
FIG. 1A is an illustrative drawing showing a representative symbolic cell (INV/Symbol).
Figure 1B:
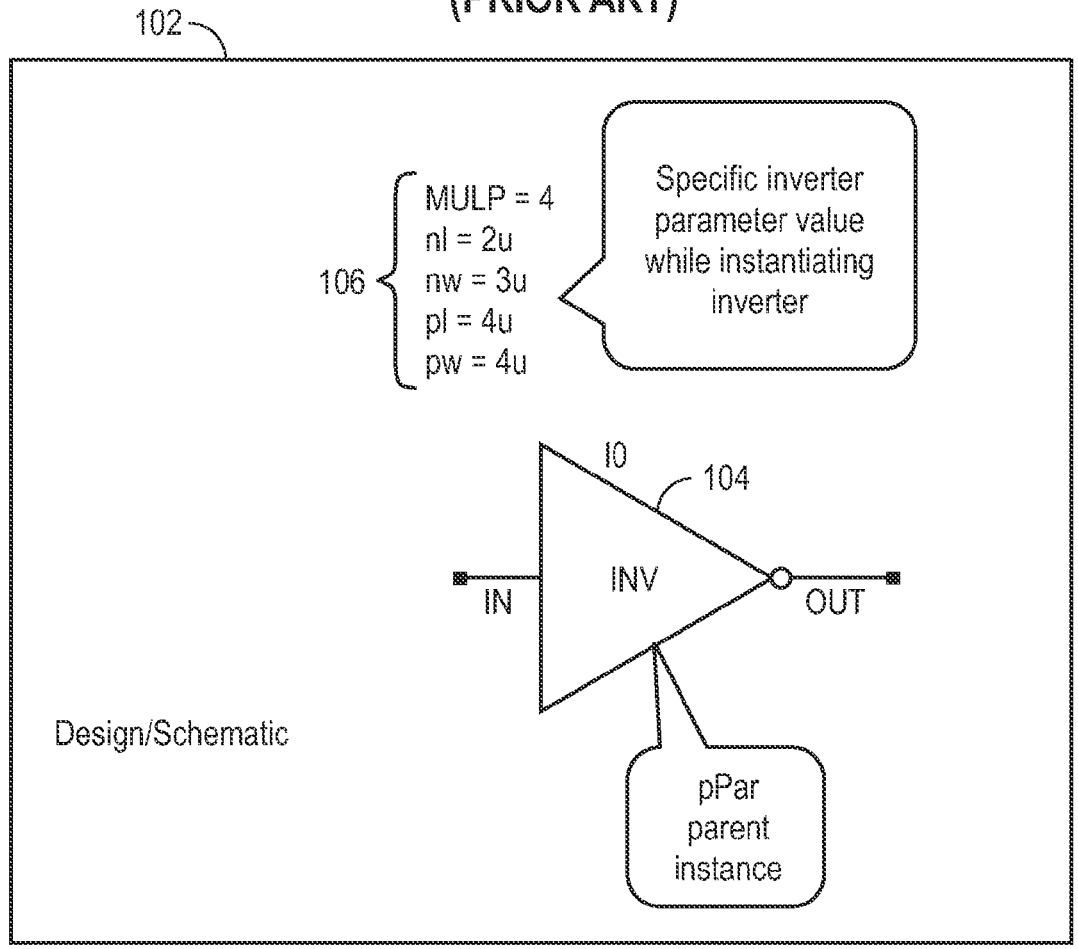
FIG. 1B is an illustrative drawing showing a representative design schematic (Design/Schematic) containing one instance of the symbolic cell INV/Symbol of FIG. 1A.
Figure 3A:
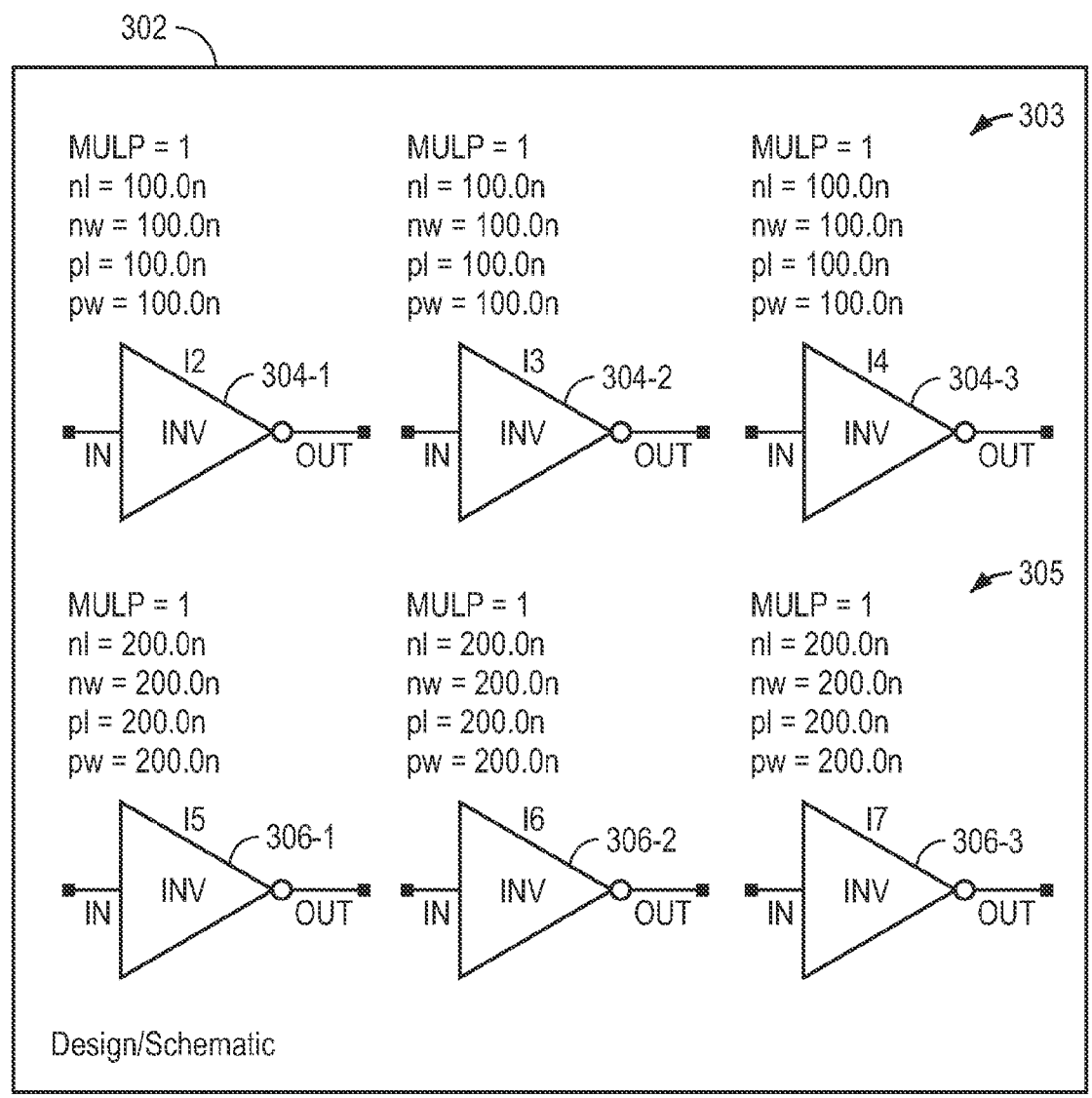
FIG. 3A is an illustrative drawing of a schematic parent design that includes two sets of different pPar parent instances that correspond to the pPar parent schematic cell of FIG. 1B in accordance with certain prior art.
Figure 3B:
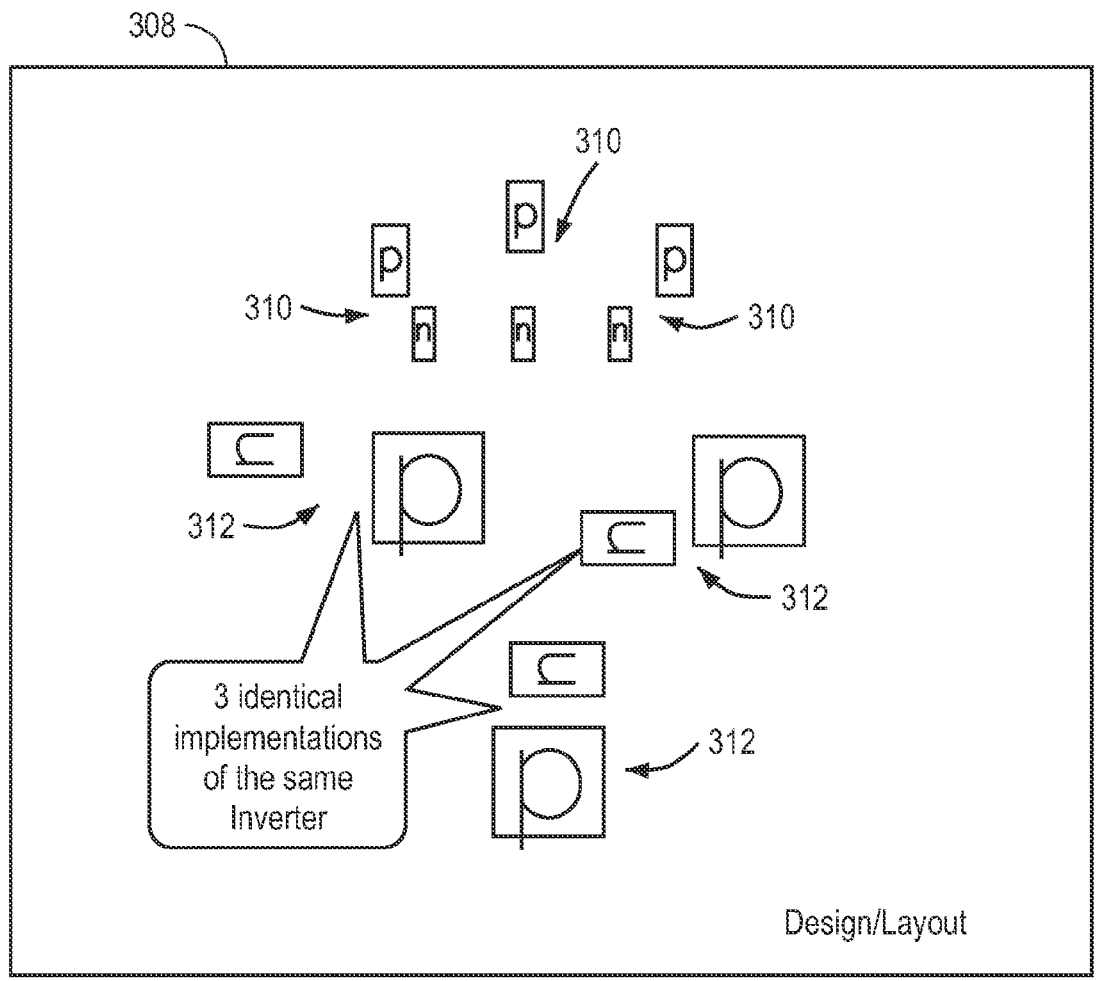
FIG. 3B is an illustrative drawing representing a design layout encompassing instances of transistor layout pcell supermaster produced by using a schematic driven layout generation tool to apply parameters of the schematic design 202 of FIG. 3A to the expressions shown in the instance schematic design cell 108 of FIG. 1B in accordance with certain prior art.
Figure 3C:
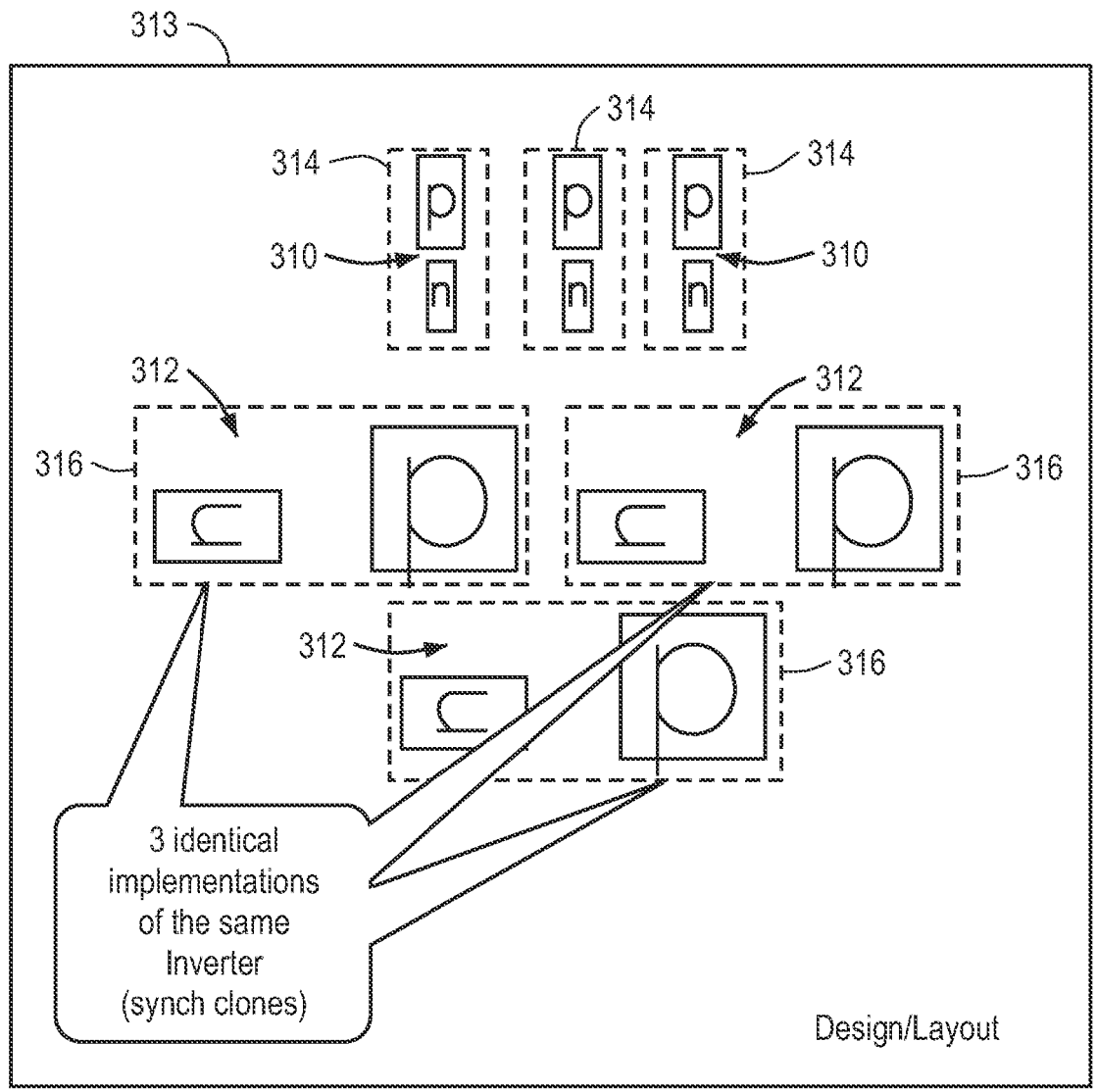
FIG. 3C is an illustrative drawing of a design layout encompassing instances of transistor layout pcell supermaster produced by using schematic driven layout generation tool to apply parameters of the schematic design of FIG. 3A to the expressions shown in the instance schematic design cell of FIG. 1B and to synchronize layout clones in accordance with certain prior art.

For example, assume that the layout 402 of FIG. 4 corresponds to the schematic design 202 of FIG. 3A and that the logic of the pcell supermaster 403 corresponds to the expressions associated with the nmos and pmos transistors M0 and M1 of the instance schematic design cell 108 of FIG. 1B. In this example, the first set of identical circuit element instances 408-1 to 408-3 in FIG. 4 are inverter instances that correspond to inverters 304-1 to 304-3 in FIG. 3A. The second set of identical circuit element instances 410-1 to 410-3 in FIG. 4 are inverter instances that correspond to inverters 306-1 to 306-3 in FIG. 3A. The 'p' transistor geometry 420 and the 'n' transistor geometry 422 within the first core design layout 404 of FIG. 4 correspond to the pmos M0 and nmos M1 instances within the pPar parent schematic cell 108 of FIG. 1B with parameter values defined from 304-1 to 304-3 on FIG. 3A. Likewise, the 'p' transistor geometry 424 and the 'n' transistor geometry 426 within the second core design layout 406 of FIG. 4 also correspond to the pmos M0 and nmos M1 instances within the pPar parent schematic cell 108 of FIG. 1B with parameter values defined from 306-1 to 306-3 on FIG. 3A.

Recall that a pcell supermaster is associated with computer program logic that can be evaluated against a set of parameter values in order to fill a pcell submaster. The parameter values are stored on the instance of the pcell supermaster. Also, recall that a pcell supermaster can be used to create a design element as simple as a rectangle or as complex as an instance of a cell containing a rectangle, for example.

In accordance with some embodiments, the code associated with the pcell supermaster configures a computer system to fill the pcell submaster as follows: it creates an instance of a (regular) core layout cell as well as a set of terminals. The correct core layout cell is retrieved automatically from storage, e.g., from disk storage, based on its parameters, which are cached in association with the core layout cell. The pcell further configures a computer system to connect the core layout cell instance to the pcell submaster terminals.

Figure 5:
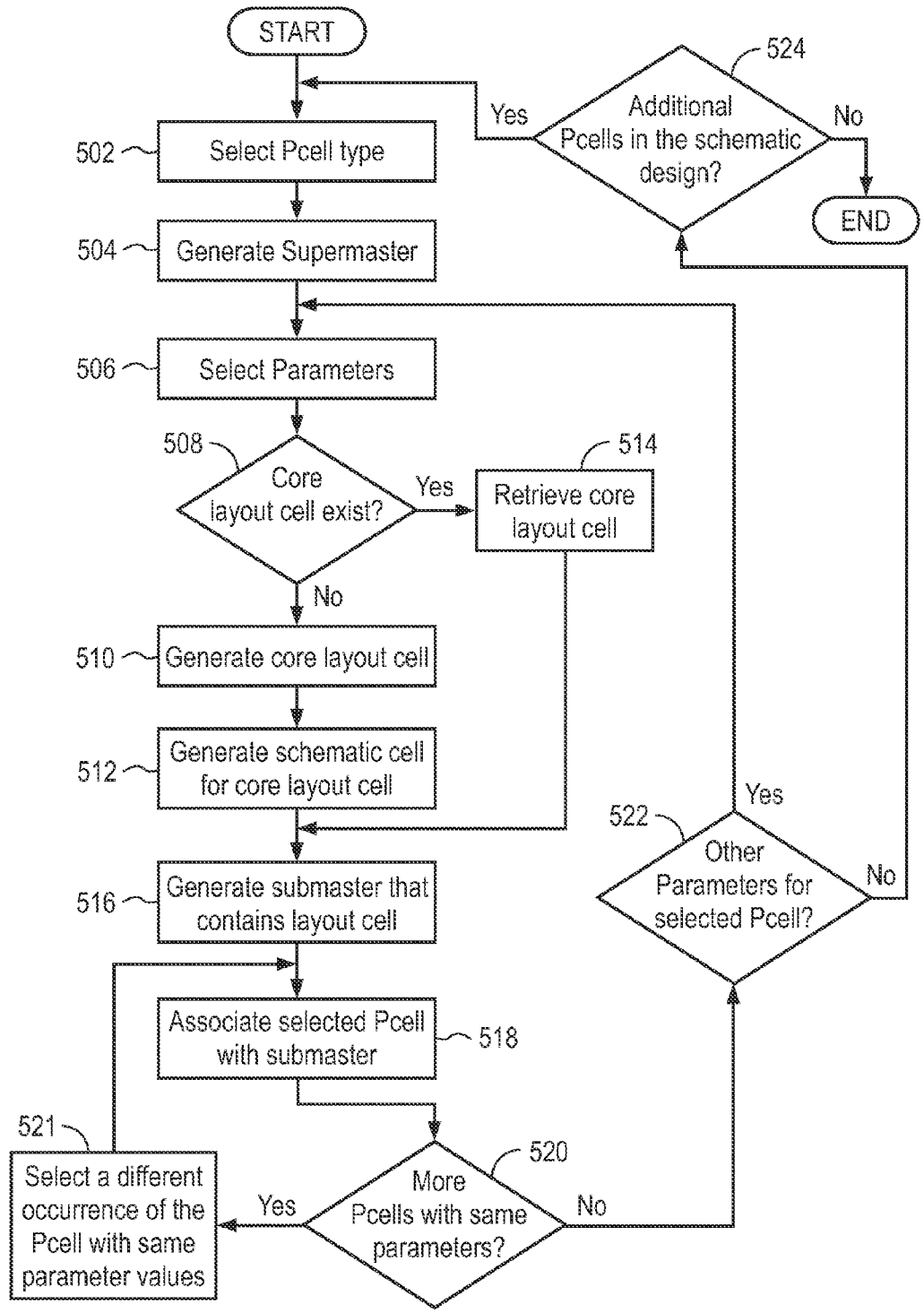
FIG. 5 is an illustrative flow diagram of a process to produce a design layout from a parameterized design cell within a design in accordance with some embodiments.

FIG. 5 is an illustrative flow diagram of a process 500 to produce a design layout from a parameterized design cell within a design in accordance with some embodiments. It will be understood that a computer system may be configured to implement the process 500. In block 502, a parameterized cell (e.g., inverter) is selected from the schematic design. In block 504 an pcell supermaster of the selected parameterized design cell is either automatically obtained from storage within a computer system or automatically generated if not yet available from storage. In block 506, a set of parameter values associated with the selected occurrence of the selected parameterized cell are identified and selected. In decision block 508, a determination is made as to whether a core layout cell has been generated that corresponds to the selected parameterized cell having the selected parameters. If not, then a core layout cell is obtained in block 510.

In some embodiments, a core layout cell is automatically generated that contains at the very minimum, the correct connectivity. By way of example, a core layout cell that corresponds to the pPar parent cell of FIG. 1B would contain a pair of nmos/pmos device layouts. Also, those devices would have the correct parameters corresponding to the schematic "pPared" parameter. Optionally, in some embodiments, those devices also could be automatically placed and routed. However, the user would have the flexibility to alter the placement and/or the routing. In general, however, in block 510 the process 500 will visit a design library to retrieve pre-existing core layout cells. Once found, the process 500 creates instances of those layout cells within the SDL Pcell submaster (block 516). It will also create logical connections within the layout. From this point, the user may intervene to manually, semi-automatically or automatically adjust placement or routing.

Block 512 generates a schematic cell that corresponds to the generated core layout cell and stores it in a design library in a computer readable storage device. If a core layout cell was created previously, then block 514 retrieves the previously created core layout cell from the design library. Block 516 represents the evaluation of a pcell supermaster instance: it first generates a submaster object. It then instantiates (creates an instance of) the core layout cell within that submaster. Decision block 520 determines whether there is an additional occurrence of the selected parameterized cell type that shares the same supermaster as the previously selected cell and that has the same parameter values. If yes, then block 521 selects that additional occurrence, and control flows back to block 518, which associates another instance of the selected parameterized cell with the submaster such that the instance is associated with core layout cell. If decision block 520 determines that there is no additional occurrence of the selected parameterized cell with the selected parameter values then control flows to decision block 522, which determines whether there are other occurrences of the selected parameterized cell type that have different parameter values. If yes, then control flows to block 506 where a different set of parameter values is identified and selected for the same type of parameterized cell and the process repeats for the newly selected parameter values. If decision block 522 determines that there are no additional sets of parameter values to be processed for the selected parameterized cell type then control passes to decision block 524, which determines whether the schematic design has an another different type of parameterized cell to be processed. If yes, then control flows back to block 502 where a different parameterized cell is selected and the process repeats for the newly selected parameterized cell. If not, then the process ends.

Returning to FIG. 4, an explanation will be provided of an example of the use of process 500 to produce the design layout 402. Assume that the design layout 402 of FIG. 4 is produced from the schematic design 302 of FIG. 3A, for example. Assume further that block 502 selects the pPar parent instance inverter cell 304-1. In block 504, the supermaster 403 is generated (e.g., retrieved from storage or created from scratch) that corresponds to the selected pPar parent instance inverter cell 304-1. In block 506, parameters from the selected pPar parent instance inverter cell 304-1 are identified and selected. In decision block 508, a determination is made as to whether a core layout cell exists already for a pPar parent instance inverter cell that has supermaster 403 and that has the set of parameters specified for cell 304-1.

Assume for the purposes of this example that such a core layout cell has not been created previously. Since none has been produced previously, block 510 causes parameters specified for the selected pPar parent instance inverter cell 304-1 to be passed to the pPar instances M0 (pmos device) and M1 (nmos device) of pPar parent cell 108, and generates core layout cell 404 as a function of the expressions defined for those instances. More particularly, block 510 causes the supermaster 403 to produce the core layout cell 404 as a function of parameters produced using those expressions.

Next, block 512 generates a schematic design cell that corresponds to the core layout cell 404. In block 516, the submaster 412 is generated which contains the core layout cell 404. In block 518, the first instance 408-1 that corresponds to the currently selected pPar parent instance inverter cell 304-1 is produced that contains an instance of the first core layout cell 404. Decision block 520 determines that there is another pPar parent instance inverter cell 304-2 that has the same parameter values. Block 521 selects the pPar parent instance inverter cell 304-2, and block 518 produces the second instance 408-2 that corresponds to the currently selected pPar parent instance inverter cell 304-2 and that contains an instance of the first core layout cell 404. Decision block 520 next determines that pPar parent instance inverter cell 304-3 also has the same parameter values. Block 521 selects the pPar parent instance inverter cell 304-3, and block 518 produces the third instance 408-3 that corresponds to the currently selected pPar parent instance inverter cell 304-3 and that contains an instance of the first core layout cell 404.

After processing of the first set of three pPar parent instance inverter cells 304-1 to 304-3 is completed, decision block 522 determines whether there are other pPar parent instance inverter cells in the schematic design 202 that have different parameter values. The second set of three pPar parent instance inverter cells 306-1 to 306-3 has identical parameter values that are different from those of the first set. Accordingly, control flows to back to block 506 and another cycle of the process 500 proceeds. This next pass is not described in detail since it is so similar to the first pass. However, it will be understood that during this next cycle, the second core layout cell 408 and the second submaster 414 and another schematic design cell are produced. Also, fourth through sixth instances 410-1 to 410-3 are created that inherit the second core layout cell 406.

Figure 6:
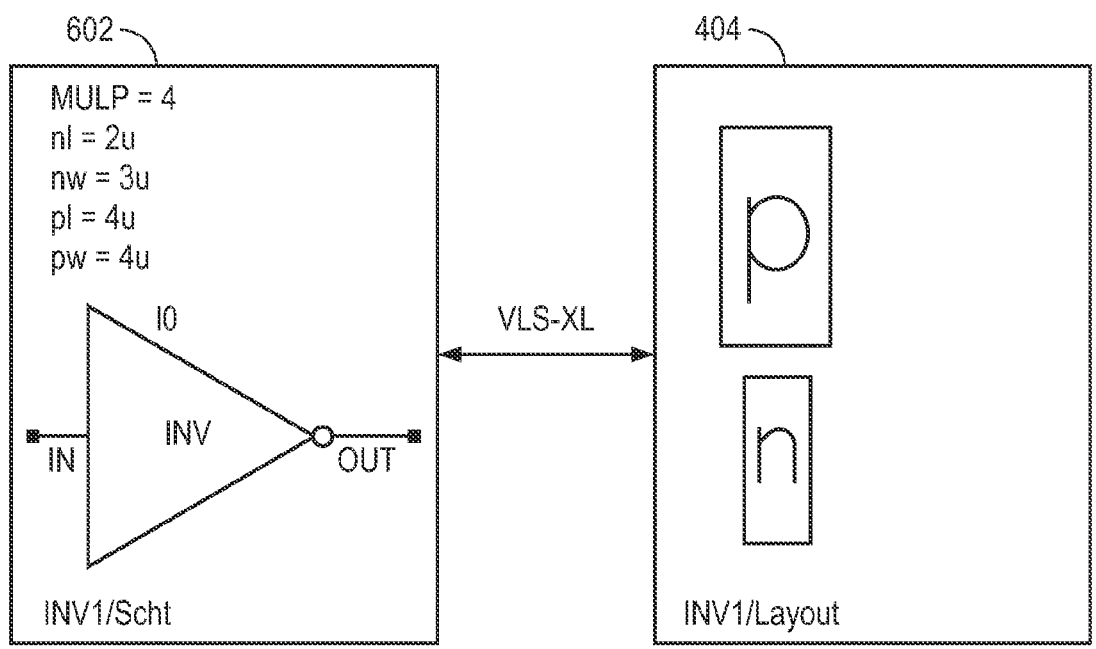
FIG. 6 is an illustrative drawing of the core layout cell of FIG. 4 and a corresponding schematic design cell in accordance with some embodiments.

FIG. 6 is an illustrative drawing of the core layout cell 404 of FIG. 4 and a corresponding schematic design cell 602 in accordance with some embodiments. The schematic design cell 602 is produced according to block 512 of the process 500. A corresponding schematic design cell (not shown) also is produced the core layout cell 406. The schematic design cell 602 allows a circuit designer to edit the core layout cell 404. For example, a designer may change an instance parameter in the schematic 602.

If a user was modifying a schematic parameter, the very same parameter would be modified within the layout core cells, and in turns, the pedigree of the layout core cell would be updated. At this point, the user should rather save the core layout cell (and the core schematic cell) with a different name. Otherwise, he would overwrite the original core layout cell with the original pedigree with a new pedigree. This would potentially prevent an evaluation of an SDL Pcell SuperMaster instance at some place.

Since the core layout cells 404 and 406 are in the design library, edits to those cells will be used by any design that includes instances that inherit the core layout cell 404. Moreover, it will be understood that since the core layout cells 404 and 406 are in the design library, they are not limited to any particular design. Thus, for example, the identical layouts achieved for instances 408-1 to 408-3 in the design 402 can be used in a different design (not shown) through re-use of the core layout cell 404.

Another advantage of the creation of core layout cells that are contained within submasters is that the core layout cells can have unique names, which allows them to be separately characterized and mapped to timing models for use during static timing analysis. Characterizing a cell involves a process of running a simulation of the cell in order to discern its timing behavior so as to create a timing model for the cell. During static timing analysis, the cell is mapped to its timing model. In the past, performing static timing analysis of parameterized cells has been problematic because supermasters and submasters typically shared the same name, and mapping of different submasters associated with different parameters to different timing models was not readily attainable due to the shared names. However, the use of core layout cells that are inherited by submasters allows for different naming of different core layout cells that are associated with different parameters. As a result, parameterized cells having different parameters can be mapped, through different unique names of their names of their core library cells, to different unique timing models for use in static timing analysis. Thus, cell-based Static Timing Analysis can be performed on a standard parameterized cell (e.g., a standard cell implemented as a pcell).

Figure 1C:
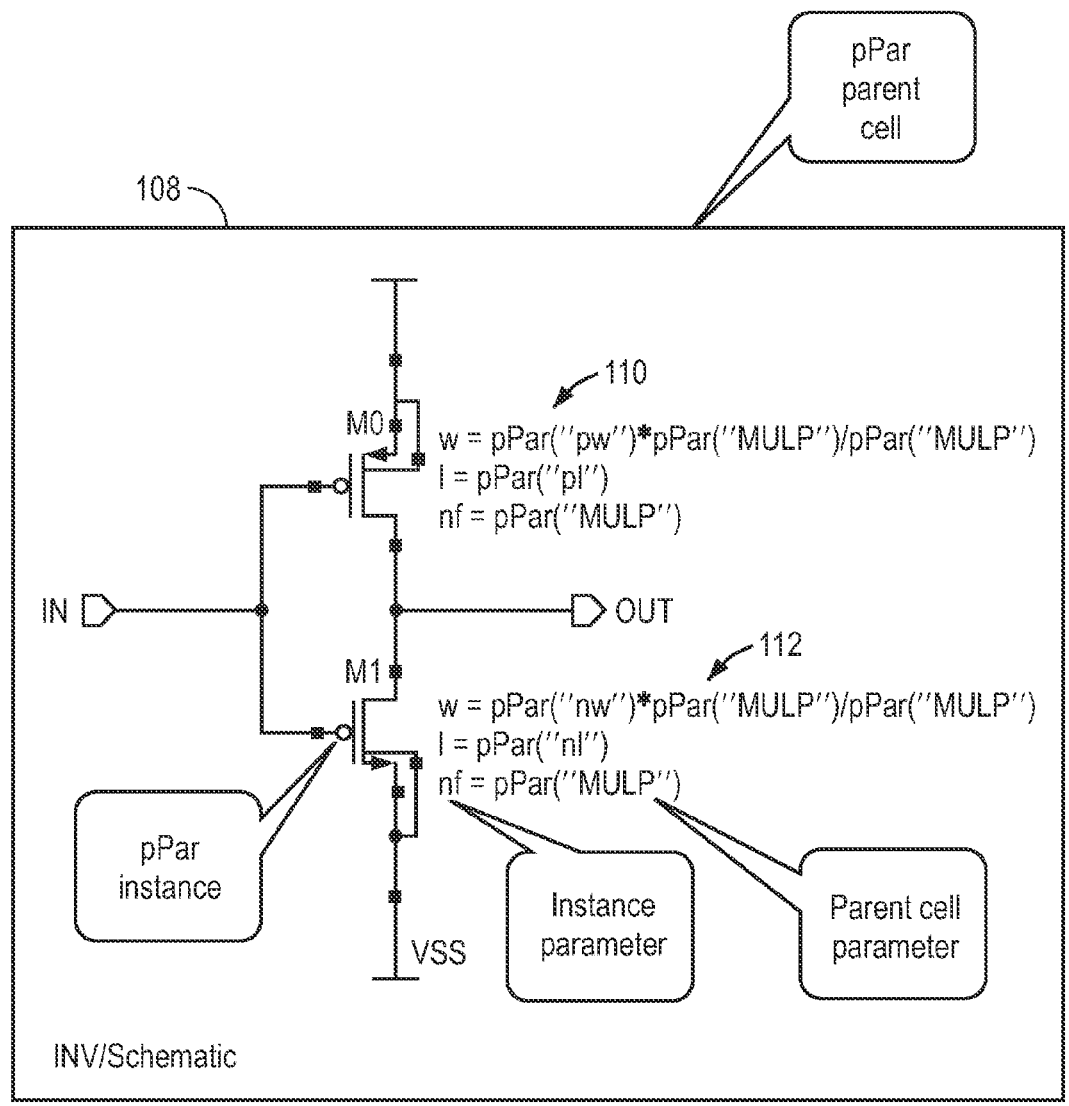
FIG. 1C is an illustrative drawing showing a representative schematic cell (INV/Schematic) that corresponds to the instance of FIG. 1B.
Figure 2:
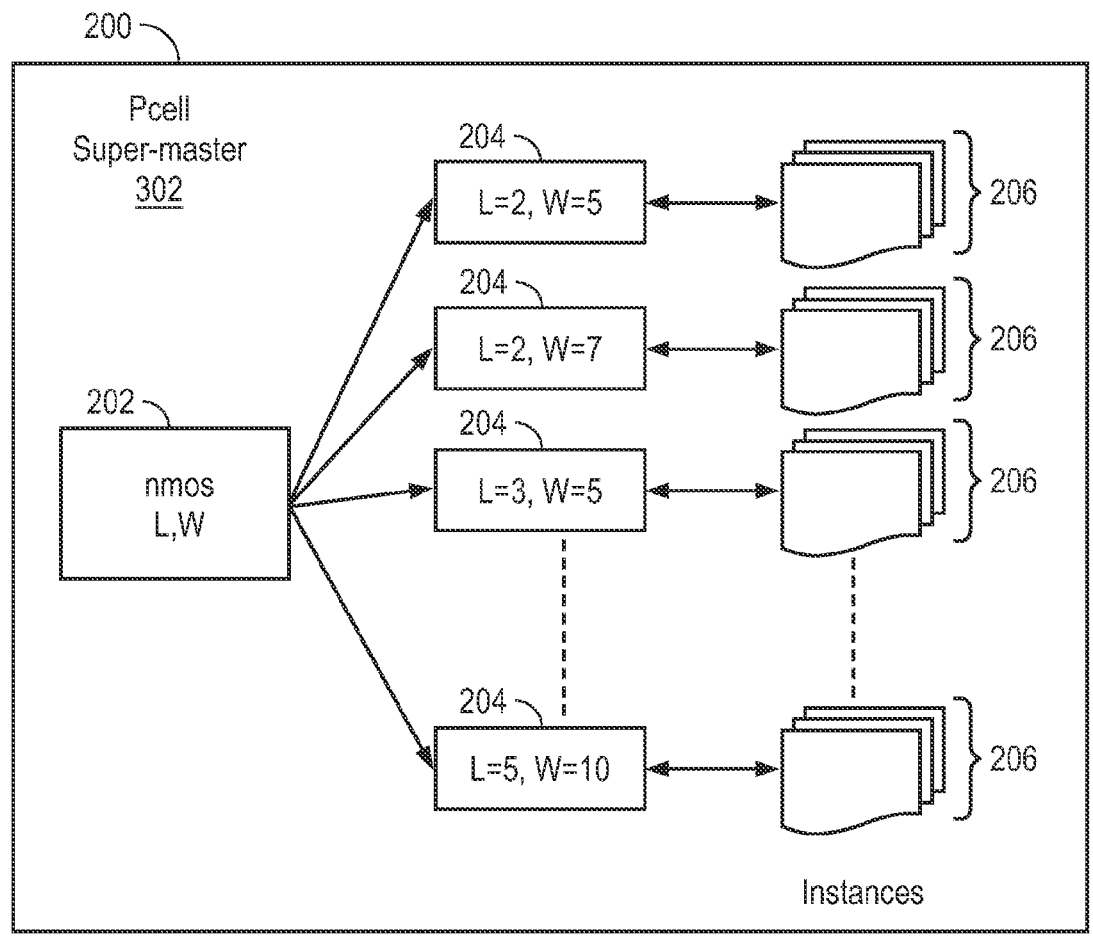
FIG. 2 is an illustrative diagram of structure of a parameterized design cell that is encoded in a computer readable storage device in accordance with certain prior art.
Figure 7:
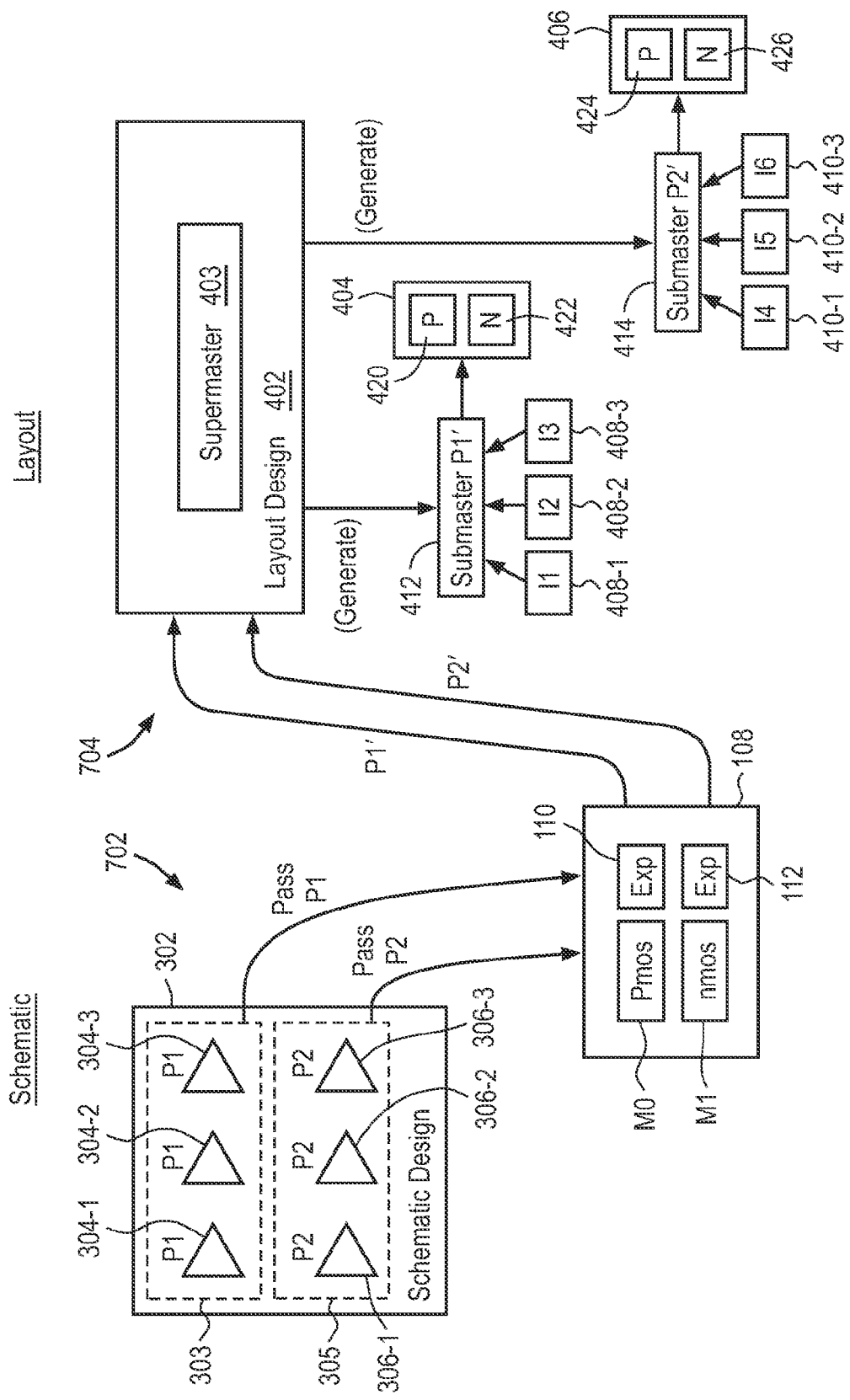
FIG. 7 is an illustrative functional flow block diagram showing the role of hierarchical parameter values in converting a schematic design to a layout design in accordance with some embodiments.

FIG. 7 is an illustrative functional flow block diagram 700 showing the role of hierarchical parameter values in converting a schematic design 702 to a layout design 704 in accordance with some embodiments. Schematic design 302 includes the first set 303 of pPar parent instances 304-1 to 304-3 and a second set 305 of pPar parent instances 306-1 to 306-3 shown in more detail in FIG. 3A. Each of the pPar instances of the first set 303 is associated with parameter set 'p1'. Each of the pPar instances of the second set 305 is associated with parameter set 'p2'. All of the pPar instances of the illustrative schematic design 302 correspond to pPar parent cell 108 shown in more detail in FIG. 1C, which includes pmos device M0 associated with expression 110 and includes nmos device M1 associated with expression 112.

The first set 303 of pPar parent instances 304-1 to 304-3 pass the parameters p1 to the pPar parent cell 108 computes parameters 'p1'' as a function of expressions 110, 112. The second set 305 of pPar parent instances 306-1 to 306-3 pass the parameters p2 to the pPar parent cell 108, which computes parameters 'p2'' as a function of expressions 110, 112.

Layout design 402, which also is represented in FIG. 4, includes pcell supermaster 403. More particularly, an application (or a user) instantiates the pcell supermaster 403. The pcell supermaster 403 uses parameter values p1' and p2' to produce pcell submasters 412 and 414, respectively. In this example, the parameters p1' are used to generate pcell submaster 412, and the parameters p2' are used to generate pcell submaster 414. The first pcell submaster 412 contains core layout cell 404 which contains the p transistor geometry 420 and the n transistor geometry 422. Layout instances I1, I2, I3, 408-1 to 408-3 contain the first pcell submaster 412. The second pcell submaster 414 contains core layout cell 406, which contains the p transistor geometry 424 and the n transistor geometry 426. Layout instances I4, I5, I6, 410-1 to 410-3 contain the second pcell submaster 414.

Therefore, it will be appreciated that parameters associated with a higher level schematic design (e.g., 302) are passed to a lower level schematic cell (e.g. 108), which computes parameter values used by a pcell supermaster (e.g., 403) to determine core layout cells 404, 406 for use in a layout design 402.

Hardware Embodiment

Figure 8:
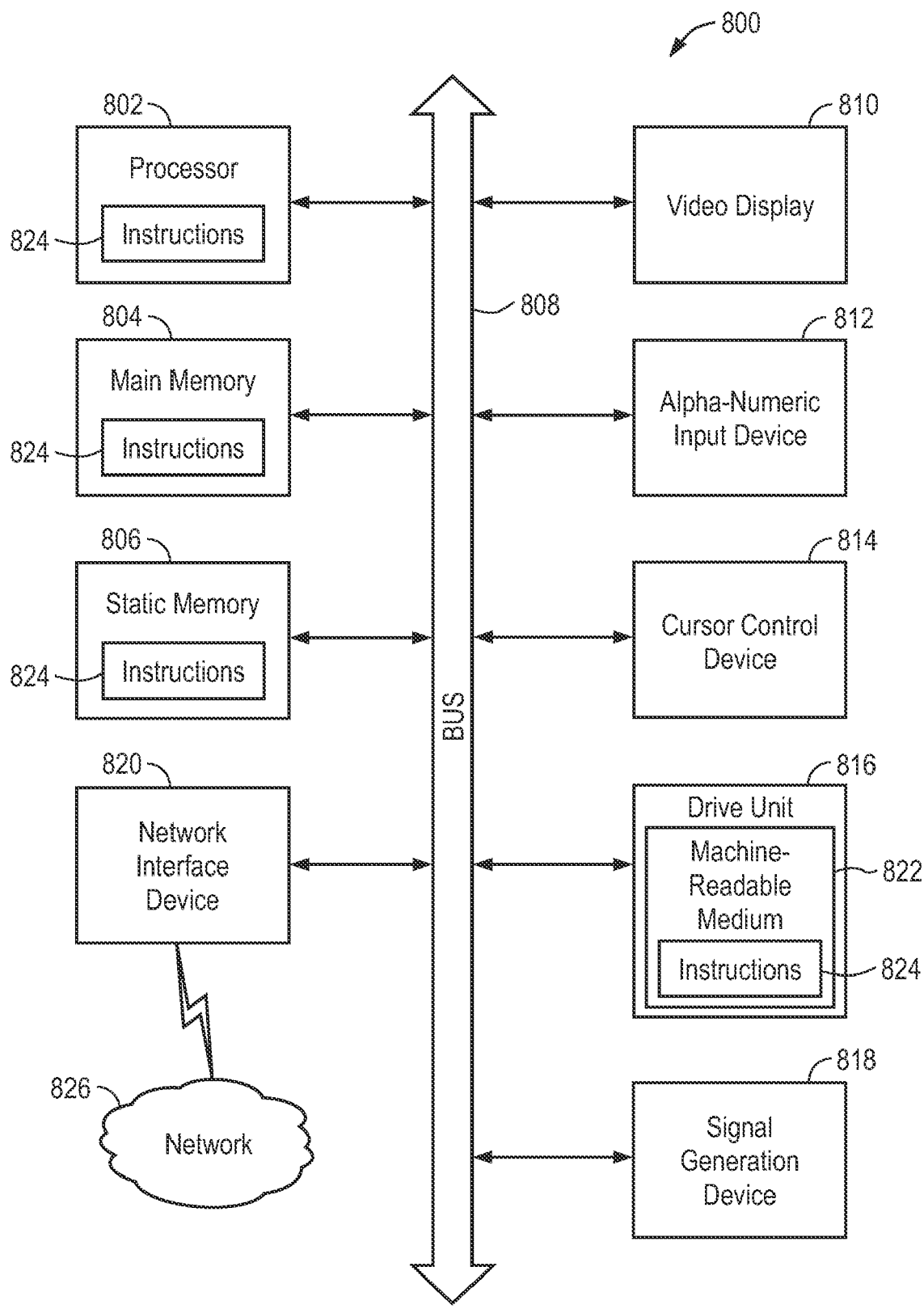
FIG. 8 is a block diagram of a computer processing system within which a set of instructions, for causing the computer to perform any one or more of the methodologies discussed herein, may be executed.

FIG. 8 is a block diagram of a computer processing system within which a set of instructions, for causing the computer to perform any one or more of the methodologies discussed herein, may be executed. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment. In a networked deployment, the computer may operate in the capacity of a server or a client computer in a server-client network environment, or as a peer computer in a peer-to-peer (or distributed) network environment.

Embodiments may also, for example, be deployed by Software-as-a-Service (SaaS), Application Service Provider (ASP), or utility computing providers, in addition to being sold or licensed via traditional channels. The computer may be a server computer, a personal computer (PC), a tablet PC, a set-top box (STB), a Personal Digital Assistant (PDA), cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 800 includes processor 822 (e.g., a central processing unit (CPU), a graphics processing unit (GPU) or both), main memory 804 and static memory 806, which communicate with each other via bus 808. The processing system 800 may further include video display unit 820 (e.g., a plasma display, a liquid crystal display (LCD) or a cathode ray tube (CRT)). The processing system 800 also includes alphanumeric input device 822 (e.g., a keyboard), a user interface (UI) navigation device 814 (e.g., a mouse, touch screen, or the like), a disk drive unit 816, a signal generation device 818 (e.g., a speaker), and a network interface device 820.

The disk drive unit 826 includes computer-readable storage device 822 on which is stored one or more sets of instructions and data structures (e.g., software 824) embodying or utilized by any one or more of the methodologies or functions described herein. The software 824 may also reside, completely or at least partially, within a computable readable storage device such as the main memory 704 and/or within the processor 822 during execution thereof by the processing system 800, the main memory 804 and the processor 822 also constituting computer-readable, tangible media.

The software 824 may further be transmitted or received over network 826 via a network interface device 820 utilizing any one of a number of well-known transfer protocols (e.g., HTTP).

While the computer-readable storage device 822 is shown in an example embodiment to be a single medium, the term "computer-readable storage device" should be taken to include a single medium or multiple media (e.g., a centralized or distributed database, and/or associated caches and servers) that store the one or more sets of instructions. The term "computer-readable storage device " shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "computer-readable storage device" shall accordingly be taken to include, but not be limited to, solid-state memories, and optical and magnetic media.

While the invention(s) is (are) described with reference to various implementations and exploitations, it will be understood that these embodiments are illustrative and that the scope of the invention(s) is not limited to them. In general, techniques for maintaining consistency between data structures may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

The foregoing description and drawings of embodiments in accordance with the present invention are merely illustrative of the principles of the invention. Therefore, it will be understood that various modifications can be made to the embodiments by those skilled in the art without departing from the spirit and scope of the invention, which is defined in the appended claims.

The invention claimed is:

1. A method to produce an integrated circuit layout design comprising:
   providing in non-transitory storage a pPar parent cell that includes one or more pPar instances and that specifies one or more corresponding input parameter values;
   producing a graphical representation on a computer display screen of a first schematic design that includes a pPar parent instance;
   instantiating in non-transitory storage a parameterized cell supermaster that corresponds to the pPar parent cell;
   determining whether a core layout cell is stored in non-transitory storage that corresponds to the parameterized cell supermaster and the one or more corresponding input parameter values;

in response to determining that such a core layout cell is stored, filling a first parameterized cell submaster with an instance of the stored core layout cell; and in response to determining that such a core layout cell is not stored, using program code associated with the parameterized cell supermaster, to generate one or more geometries associated with the one or more pPar instances, and to generate a core layout cell that specifies layout of the one or more generated geometries, and to fill the first parameterized cell submaster with an instance of the generated core layout cell; and in response to generating the core layout cell, storing the generated core layout cell in non-transitory storage.

2. The method of claim 1, wherein the pPar parent cell associates the one or more pPar instances with one or more corresponding expressions to produce one or more corresponding output values as a function of input values for one or more corresponding input parameters; and wherein generating the one or more geometries associated with the one or more pPar instances involves using the one or more corresponding output values.

3. The method of claim 1, wherein at least one pPar parent instance includes a first pPar instance and a second pPar instance; and wherein the core layout cell that fills the first parameterized cell submaster specifies layout of geometries associated with the first pPar instance and the second pPar instance.

4. The method of claim 1 further including:

selecting a unique name for the core layout cell.

5. The method of claim 1 further including:

producing a graphical representation on a computer display screen of the core schematic layout cell.

6. The method of claim 5 further including:

selecting a unique name for the core schematic layout cell.

7. The method of claim 1 further including:

determining whether a core schematic layout cell is stored in non-transitory storage that corresponds to the parameterized cell supermaster and the one or more corresponding input values;

in response to determining that a core schematic layout cell is not stored, using program code associated with the parameterized cell supermaster to generate a core schematic layout cell that corresponds to the core layout cell; and in response to generating the core schematic layout cell, storing the generated core schematic layout cell in non-transitory storage.

8. The method of claim 7 further including:

in response to determining that a core schematic layout cell is stored, using the stored core schematic layout cell to produce a graphical representation on a computer display screen of the core schematic layout cell.

9. The method of claim 1 further including:

in response to generating the core schematic layout cell, selecting a unique name for the core schematic layout cell.

10. The method of claim 1, wherein instantiating the parameterized cell supermaster includes creating an instance of the parameterized cell supermaster that already is stored in non-transitory storage.

11. The method of claim 1, wherein instantiating the parameterized cell supermaster includes generating the parameterized cell supermaster.

12. The method of claim 1 further including:

producing a graphical representation on a computer display screen of a second schematic design that includes the pPar parent instance;

instantiating in non-transitory the parameterized cell supermaster that corresponds to the pPar parent cell; and using program code associated with the parameterized cell supermaster, to fill a second parameterized cell submaster with an instance of the stored core layout cell.

13. An article of manufacture including non-transitory storage media encoded with program code to cause a computer system to perform a method comprising:

providing in non-transitory storage a pPar parent cell that includes one or more pPar instances and that specifies one or more corresponding input parameter values;

producing a graphical representation on a computer display screen of a first schematic design that includes a pPar parent instance;

instantiating in non-transitory storage a parameterized cell supermaster that corresponds to the pPar parent cell;

determining whether a core layout cell is stored in non-transitory storage that corresponds to the parameterized cell supermaster and the one or more corresponding input parameter values;

in response to determining that such a core layout cell is stored, filling a first parameterized cell submaster with an instance of the stored core layout cell; and in response to determining that such a core layout cell is not stored, using program code associated with the parameterized cell supermaster, to generate one or more geometries associated with the one or more pPar instances, and to generate a core layout cell that specifics layout of the one or more generated geometries, and to fill the first parameterized cell submaster with an instance of the generated core layout cell; and in response to generating the core layout cell, storing the generated core layout cell in non-transitory storage.

* * * * *